Sept. 27, 1966  T. R. FOLSOM ET AL  3,275,804
COMPUTING APPARATUS
Filed Oct. 24, 1960  5 Sheets-Sheet 1

INVENTORS
THEODORE R. FOLSOM
RICHARD A. CRAMER
BY Fulwider, Mattingly & Huntley
Attorneys Sept. 27, 1966     T. R. FOLSOM ET AL     3,275,804
COMPUTING APPARATUS Filed Oct. 24, 1960     5 Sheets-Sheet 4

INVENTORS
THEODORE R. FOLSOM
RICHARD A. CRAMER

BY *Bulwider Mattingly & Huntley*

ATTORNEYS

Fig. 7

INVENTORS
THEODORE R. FOLSOM
RICHARD A. CRAMER
BY Fulwider Mattingly & Huntley
ATTORNEYS

United States Patent Office 3,275,804
Patented Sept. 27, 1966

3,275,804
COMPUTING APPARATUS
Theodore R. Folsom, La Jolla, and Richard A. Cramer, Solana Beach, Calif., assignors to The Regents of the University of California
Filed Oct. 24, 1960, Ser. No. 64,566
5 Claims. (Cl. 235—61.6)

The present invention relates to an apparatus for use in conjunction with a radioactivity analyzer which contains a digital register, whereby to perform various mathematical operations upon data contained in the register so as to facilitate the evaluation of radioactivity data.

This application is a continuation-in-part of our application Serial No. 828,350, filed July 20, 1959, for Computing Apparatus, and assigned to the same assignee as the present application, now U.S. Patent No. 3,110,799.

The present importance of radioactive substances underscores the need for instruments useful in studying radioactivity. An important feature of a radioactive substance is the gamma-ray spectrum of the radiation from the substance. The gamma-ray spectrum is a plot of radiation intensity versus energy level, and is characteristic of the radioactive substance from which it is taken.

One apparatus for providing a gamma-ray spectrum includes a scintillating crystal for converting gamma-rays into light traces. The light traces from the crystal are then converted into electrical signals by a photo-electric device, which signals may be segregated on the basis of amplitude and counted. A plot of the number of scintillations counted at various energy levels then comprises a gamma-ray spectrum which is useful in analyzing the substance from which the radiation was sensed.

In the study of gamma-ray spectra taken from various radioactive substances, it is often desirable to subtract (or add) certain known spectra, to better define the unknown spectra data. Of course, this operation can be performed mathematically or graphically; however, in general, both of these operations are extremely time-consuming and laborious.

Various arithmetic operations could be performed upon spectral data by a general-purpose computing machine. However, these machines are normally quite expensive and require considerable programming to perform the desired operation. Therefore, these operations are best performed by a special-purpose computer which is specifically designed for this purpose. One form of such a computer is shown and described in the aforementioned copending patent application Serial No. 828,350, now Patent No. 3,110,799.

The present invention is an improved form of that disclosed in the above-referenced patent application. The present invention may be operated in conjunction with a digital register, which register may be employed to hold spectral data. The contents of the register may be recorded (by an apparatus of the present invention) upon an external record, as magnetic tape, punch cards, punch-paper tape, or various other forms of records. The data recorded upon the external record may then be added to, or subtracted from the contents of the digital register, or alternatively selected portions of the data from the external record may be arithmetically combined with the contents of the digital register. Therefore, the apparatus of the present invention provides an economical system which may be employed to perform various arithmetic operations upon data and thereby facilitate the study of such data.

An object of the present invention is to provide an improved special-purpose computer for use in conjunction with a gamma-ray analyzer to facilitate the study of spectral data.

Another object of the present invention is to provide a computing accessory for use in conjunction with a gamma-ray analyzer, which may be economically manufactured and which enables various mathematical operations on spectral data to facilitate the study thereof.

Still nother object of the present invention is to provide an apparatus which may be economically manufactured, and which may be automatically programmed to transfer selected data from one location to another.

A further object of the present invention is to provide a substantially-entirely electronic system which may be economically manufactured, for controlling the transfer of data from one location to another, and for performing arithmetic operations upon such data in the course of transfer.

These and other objects and advantages of the present invention will become apparent from the following specification when taken in conjunction with the appended drawings.

Figure 1:
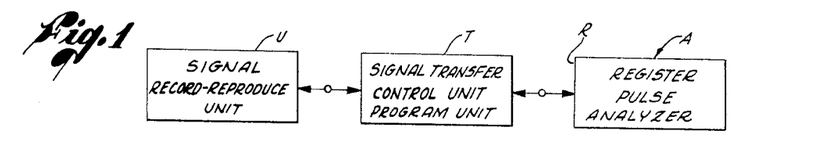
FIGURE 1 is a block diagram of the basic components of a system constructed in accordance with the present invention.

Referring initially to FIGURE 1, there is shown a pulse analyzer A incorporating a register R. The analyzer A may take various forms, one of which is a multi-channel analyzer manufactured by Radiation Counter Laboratories, Inc., and identified as Model No. 2603. This exemplary pulse-analyzer is of a class commonly referred to as the "Argonne" type. Although the illustrative embodiment of the present invention is described in conjunction with such a pulse-analyzer, it is to be understood that the pulse analyzer A may take the form of a variety of types of equipment, and include any apparatus in which data is registered or provided in the form of digital signals.

The register R is connected through a signal transfer control unit T to a signal recording-reproducing unit U. In the operation of the system illustrated in FIGURE 1, digital information may be registered in the register R of the pulse analyzer A. Signals representative of such data may then be transferred (under control of the control unit T) to the recording-reproducing unit U which serves to record such signals upon various external records as magnetic tape. Thereafter, signals may be sensed from the external records by the recording-reproducing unit U, altered by the control unit T to effect a change in the numerical value represented, and thereafter registered in the register R. In transferring signals through the control unit T to the register R, the data representations of such signals may be added to (or subtracted from) the values represented by signals registered in the register R under control of a program unit contained in the control unit T.

Consider now a relatively simple example of an operation which may be performed by the system of FIGURE 1 to evaluate data, e.g., a gamma-ray spectrum. Assume that the pulse analyzer A has functioned to sense and record a gamma-ray spectrum from an unknown radioactive source. Assume further that a cursory consideration of the spectrum suggests the presence of $Na^{22}$. In such a situation it would be desirable to view the gamma-ray spectrum with the known spectrum of $Na^{22}$ removed. In this way, the unknown aspects of the spectrum might be better defined.

To perform such an operation, the unknown spectrum would be placed (one component at a time) in the register R. The components of the $Na^{22}$ spectrum would then be sensed from an external record by the recording-reproducing unit U and transferred through the control unit T to be subtracted from the contents of the register R. If the spectral data registered in the register R and the spectral data recorded upon the external record were not observed over a similar interval of time, the data from the recording-reproducing unit U could be multiplied by some factor (integer or fraction) to adjust that data to a magnitude of an accumulation interval similar to the data in the register R.

In addition to the exemplary operation described above, it will be readily apparent to one skilled in the art of gamma-ray spectroanalysis that various embodiments of the present invention may be used in a variety of manipulations to evaluate gamma-ray spectrum. Furthermore, it will be readily apparent to one skilled in the art of electronic computers and data processors that embodiments of the present invention would have considerable utility in handling data completely unrelated to gamma-ray spectrum.

Figure 2:
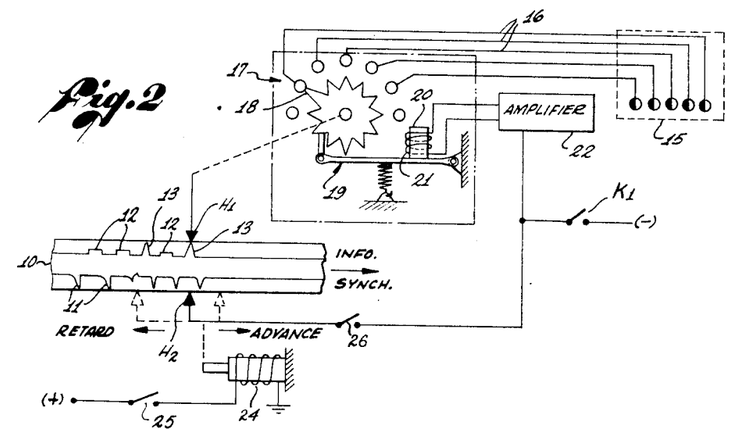
FIGURE 2 is a schematic diagram of an automatic system constructed in accordance with the present invention.

FIGURE 2 illustrates a simple system embodying our invention for carrying out division and multiplication automatically. In the system of FIGURE 2, there is provided a dual-track magnetic tape 10. On one track, we record spaced synchronizing pulses 11. On the other track, we provide spaced information pulses 12, 13 and such information pulses lie between adjacent synchronizing pulses. Sensing heads $H_1$ and $H_2$ are provided for picking up pulses from the respective tracks.

A five-stage register scaler 15 is coupled through leads 16 to a sequence stepping switch 17, so that an information pulse from the sensing head $H_1$ can be sent to any of the stages of the scaler depending upon the position of the moving contact arm 18 of the stepping switch 17. The contact arm 18 is advanced stepwise by a rack-and-pawl 19 that is acted upon by the armature 20 of a solenoid 21. The solenoid 21 is energized through an amplifier 22 from the sensing head $H_2$. The solenoid 21 may also be energized from some other pulse source, e.g., momentary closure of a key $K_1$ that is connected between the amplifier 22 and a suitable voltage source.

As will now be apparent, there are different ways in which the stepping switch 17 may be operated for effecting division or multiplication. One way is to shift the sensing head $H_2$ relative to the sensing head $H_1$ (advance or retard) by energizing a solenoid 24 through a switch 25. This causes the arrival of the pulses operating the switch 17 at an altered time sequence that effects multiplication or division. Alternatively, the switch $K_1$ may be closed momentarily to cause the contact arm 18 to advance, or a switch 26 connected between the head $H_2$ and the amplifier 22 may be opened for a period to allow a predetermined number of pulses to be lost, and their operations will influence the choice of leads 16 elected for any information pulse.

A more detailed explanation will now be made with reference to FIGURES 3 and 4, which may be placed side by side to illustrate one entire operating system.

Figure 4:
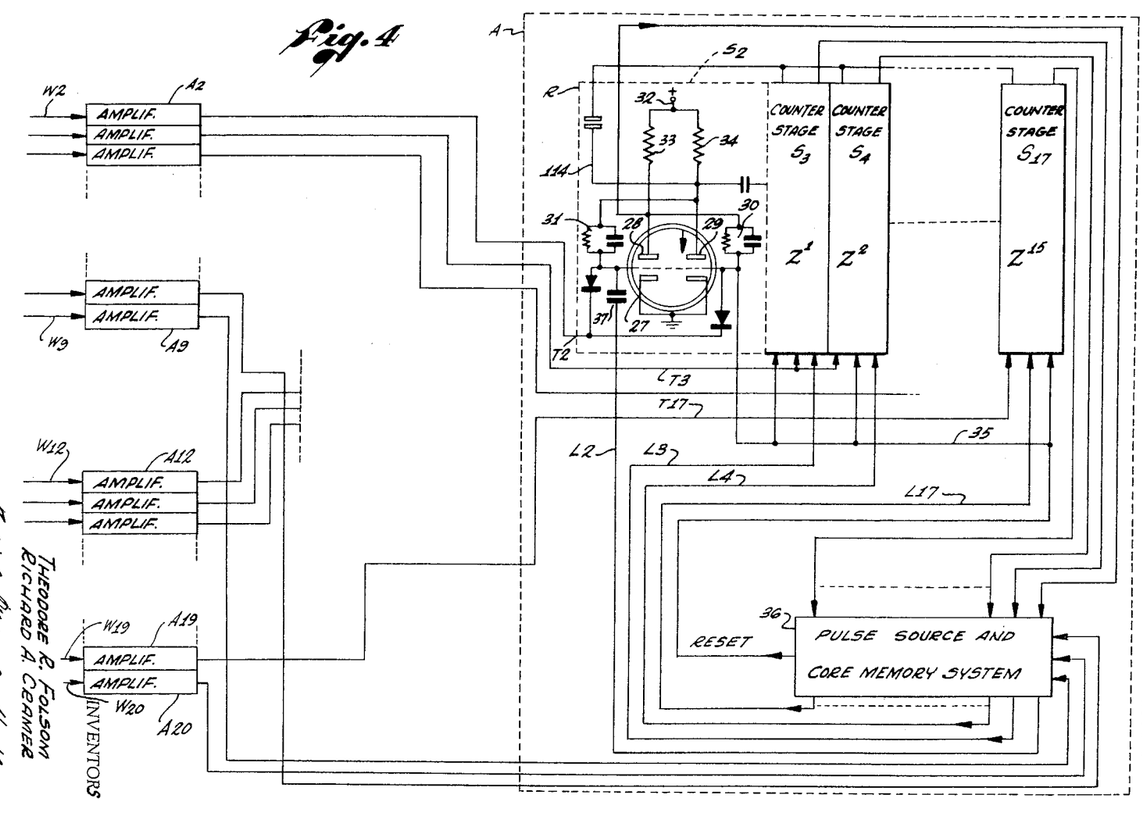

FIGURE 4 shows the pulse analyzer A which, in the illustrative embodiment of the present invention, includes apparatus for sensing and segregating gamma radiation on the basis of frequency or energy level, and apparatus in the form of a coincident-current magnetic-core memory for registering digital signals indicative of the amount of radiation sensed at various energy levels. Still further, there is included a control mechanism for transferring numerical values (representative of the intensity of radiation at a particular frequency) between the memory and a binary register R. The register R includes sixteen stages $S_2$ through $S_{17}$, all of which are similar and only $S_2$ of which is shown in detail. The stages of the register R are interconnected in a cascaded relationship whereby to perform arithmetic combinations as binary addition for example.

The stages $S_2$ through $S_{17}$ of the binary multi-stage register R are employed to receive the digits or orders of a numerical value from $2^0$ through $2^{15}$, respectively. That is, the orders of a binary numerical value are registered in the register R with the least-significant order in the stage $S_2$ and the most-significant order in the stage $S_{17}$. Of course, each order has only two possible values, i.e., one or zero, which are indicated in the stages $S_2$ through $S_{17}$, depending upon the side of a dual-triode tube which is conductive. That is, basically each of the stages $S_2$ through $S_{17}$ comprises a bistable multivibrator which has two stable states during which electron current is established through one or another set of electrodes. Specifically, the state $S_2$, for example, includes a tube 27 having triode sections 28 and 29. The plate of the triode section 28 is coupled through a coupling circuit 30 to the grid of the triode section 29. In a similar manner, the plate of the triode section 29 is coupled through a coupling circuit 31 to the grid of the triode section 28. As a result of these symmetrical cross connections, the tube 27 is operated in the well known bistable-multivibrator fashion, whereby one of the triode sections is maintained cut off while the other is conducting.

According to the operation of the present system, the conducting state of the triode section 29 indicates that a "one" is registered in the stage $S_2$. Conversely, the conducting state of the triode section 28 indicates a "zero" to be registered in the stage $S_2$. This convention is followed for each of the stages in the register R.

The triode sections of the tube 27 are energized from a source of potential connected to a terminal 32 which is in turn connected through resistors 33 and 34 to the plates of the triode sections 28 and 29 respectively. The cathodes of the triode sections 28 and 29 are connected in common to ground.

The grids of all the triode sections 29 in the stages $S_2$ through $S_{17}$ are connected to a conductor 35 which is in turn connected to a pulse source and core memory system 36. When energized, the conductor 35 provides a negative signal to the grids of the triode section 29, which signal interrupts the flow of current in the section 29 and establishes the flow of current in the triode section 28. In this manner, the system 36 may reset the stages in the register R to indicate "zero."

The grids of the triode sections 28 in the stages $S_2$ through $S_{17}$ are connected through coupling condensers (as condenser 37) to conductors $L_2$ through $L_{17}$, which are connected to the memory system 36. The conductors $L_2$ through $L_{17}$ serve to provide negative pulses from the memory system 36 to the grids in the triode sections 28 whereby to register "one" values in the various stages of the register R. In the exemplary form of the memory system 36, a magnetic-core memory is provided which is capable of registering 256 sixteen-digit binary values. Each of these values may be placed in the register R through the conductors $L_2$ through $L_{17}$.

According to the operation of the illustrative system of the present invention, the signals registered in the register R (representative of spectral data) may be recorded upon an external medium, e.g., a loop of magnetic tape, and thereafter, these signals may undergo various arithmetic and algebraic operations in the course of being transferred back to the register R for addition to (or subtraction from) the existing contents of the register R. Furthermore, these operations may be performed under control of a control system, variously programmed in accordance with the desired results.

Keeping the above considerations in mind, the operation and structure of the illustrative embodiment may best be described by assuming a sequence of operation and introducing the components of the system as the description of the operation proceeds. In pursuing this description, the initial consideration shall be the operation of transferring a numerical value (represented by digital signals) from a loop 10 of magnetic tape (FIGURE 3) to the register R.

At the outset, a manual double-pole single-throw switch 37 (upper right center of FIGURE 3) is momentarily closed. This switch provides positive and negative voltages which reset a pair of counting tubes 38 and 40 as well as to reset a bistable multivibrator 57 in the starting state. The tubes 38 and 40 each contain ten cathodes, designated $C_1$ through $C_{20}$. Although the disclosed embodiment of the invention employs a pair of these multi-cathode gas switching tubes in the control of data flow, it is readily apparent that a single tube could be employed, if available, or a plurality of interconnected switching devices also might be used.

The tubes 38 and 40 each contain a plate electrode, that is connected to a source of positive potential, and respective pairs of switching electrodes 44 and 46. In the operation of the tubes 38 and 40, the application of positive and negative signals to the switching electrodes 44 or 46 causes the conduction through the tube to advance from one cathode to the next in numerical sequence.

Pulses picked up by the sensing heads $H_1$, $H_2$ are applied to respective amplifiers 50, 51. As shown, the outputs of these amplifiers 50, 51 are coupled to respective pulse shaper networks 52, 53. When our system is set into operation, a synchronizing pulse 11 is first applied through the sensing head $H_2$ and the associated amplifier 51 to the pulse shaper 53. The pulse shaper 53 has output connections, as at 54, 55, to bistable multivibrators 56, 57.

The bistable multivibrator 57 is adapted to operate a monostable multivibrator 59 which is coupled to the starting electrodes 44 of the gas switching tube 38. The multivibrator 57 responds to the pulse from the shaper 53 to actuate the multivibrator 59 and thus drive the tube 38 from conduction in the cathode $C_1$ to conduction in the cathode $C_2$.

Simultaneously with the described operation of the tube 38, the pulse from the shaper 53 to the multivibrator 56 is utilized to similarly operate another gas tube 61. The tube 61 has cathodes $C_1 \ldots C_{10}$, and, like the tube 38, has starting electrodes 62 coupled to a monostable multivibrator 63. This multivibrator 63 is coupled to the multivibrator 56, so as to be operated by the pulse therefrom to drive the tube 61 from its initial conduction at its cathode $C_1$ to conduction at its second cathode $C_2$.

As the tracks on the tape 10 are arranged so that an information pulse follows the first synchronizing pulse, the next succeeding pulse is detected by the sensing head $H_1$ and fed to the amplifier 50. The pulse output of the amplifier 50 is fed through the shaper 52 to a sorter 65. The sorter 65 is adapted to actuate one or the other of a pair of bistable multivibrators 66, 67, depending upon its state. In this system, the sorter 65, in response to the first synchronizing pulse, is conditioned so that the information pulse applied to the sorter causes it to operate the bistable multivibrator 66. In this connection, the sorter is coupled to a so-called "not and" gate 70 that has its inputs coupled to the bistable multivibrator 57 and to a bistable multivibrator 71 that is coupled to the cathode $C_{10}$ of the tube 61. The multivibrator 71 has its other input coupled to the cathode $C_{11}$ of the tube 40. When an output of predetermined character appears from the gate 70, the sorter 65 is conditioned to permit the succeeding information pulse to operate the multivibrator 66.

The next sueceding synchronizing pulse is fed through the amplifier 51 and the shaper 53 to reset the bistable multivibrator 56; such operation does not again drive the monostable multivibrator 63. This synchronizing pulse is one that operates through the shaper 53 to cause the bistable multivibrator 57 to drive a monostable multivibrator 74. This in turn drives the tube 40 to cause conduction therein to advance from its cathode $C_{11}$ to the cathode $C_{12}$. Simultaneously, the output of the multivibrator 74 is applied to an "and" gate 75.

The gate 75, which is also connected to the multivibrator 66, and has previously been opened thereby, is connected to a battery of "and" gates 76 that are coupled to the cathodes $C_2$–$C_{10}$ of the tube 38, and which are provided with respective output connections $W_2$–$W_{10}$. In this manner, through operation of the gate 75, the battery of gates is interrogated. Since the tube 38 is currently conducting at its second cathode $C_2$, only its gate can pass the interrogating pulse from the gate 75. This interrogation pulse which appears at the output lead $W_2$, passes to the $2^0$ stage, i.e., the counter stage $S_2$ (see FIGURE 4), of the register R.

The next following information pulse is passed through the sorter 65 to the bistable multivibrator 67. In a manner similar to the multivibrator 66, the multivibrator 67 sets an "and" gate 77 so that the following synchronizing pulse causes the monostable multivibrator 59 to operate the gate 77. Such operation feeds an interrogation pulse to a battery of "and" gates 78 that are coupled to the cathodes $C_{12}$–$C_{20}$ of the tube 40. The gates are shown to have output leads $W_{12}$–$W_{20}$. At this period in the operation of the system, the cathode $C_{12}$ is conducting; thus, the interrogating pulse passes through the lead $W_{12}$, and thence to the $2^1$ stage, or the counter stage $S_3$, of the register R.

The steps above discussed are repeated, with the tubes being alternately advanced, and their output gates interrogated, when the cathode $C_{10}$ of the tube 38 is reached, a 16-digit binary number has been transferred from the tape to the register, i.e., report to all the stages $S_2$–$S_{17}$ ($2^0$–$2^{15}$) will have been accomplished.

It should be noted that amplifiers $A_2$–$A_9$ are coupled between the gate output leads $W_2$–$W_9$ and the stages $S_2$–$S_9$ of the register. Also, the amplifiers $A_{12}$–$A_{19}$ are coupled between the leads $W_{12}$–$W_{19}$ and the stages $S_{10}$–$S_{17}$. Such amplifiers are employed to bring the pulses to a magnitude sufficient to operate the respective stages $S_2$–$S_{17}$.

The cathode $C_{10}$ of the tube 61 is reached simultaneously with the cathode $C_{10}$ of the tube 38. This conducting state of the tube 61 causes the bistable multivibrator 71 to be "set" so that the gate 70 is closed. Also, another such gate 80, which is also connected to the multivibrators 57, 71 and the sorter 65, is closed. This operation disables the sorter 65 so that it is not controlled by the multivibrator 57. No further information pulses are passed while the sorter is thus disabled.

With the tube 38 conducting at its tenth cathode $C_{10}$ as above described, the next synchronizing pulse causes the associated gate to be interrogated, and to pass a pulse through the lead $W_{10}$ to an "and" gate 81. This gate 81 is adapted for connection through one of a number of switches 82–90 that are connected to the first nine cathodes $C_1$–$C_9$ of a gas switching tube 91. A monostable multivibrator 92, which is connected to the cathode $C_{10}$ of the tube 91 and to the bistable multivibrator, is selectively operated to control the switching electrodes 93 of the tube 91.

As of the time when there is conduction in the tube 38 at its cathode $C_{10}$, and the tube 91 is conducting at its first cathode $C_1$, the gate 81 is opened if the switch 82 is closed. The pulse from the output lead $W_{10}$ passes through the gate 81 to be fed to the pulse source and core memory system 36 for "writing" the information currently in the register R back into the static magnetic memory of the system 36.

The next succeeding synchronizing pulse functions through the multivibrators 57, 74 and the tube 40 to interrogate the gate associated with the cathode $C_{20}$. The resulting pulse is fed through the lead $W_{20}$ to cause the system 36 to send into the register the information contained in the next sequential number of the static memory. Assume, for example, that the system 36 employs a static magnetic memory that holds 256 binary numbers, each having sixteen digits. In such case, the pulse applied through the lead $W_{20}$ may cause the second sequential binary number stored in the static memory to pass into the register, where addition or subtraction therewith of a tape-stored number can be carried out. The next two following synchronizing pulses cause the tubes 38, 61 to step to conduction at their first cathodes $C_1$.

The last synchronizing pulse of the first digital number is arrived at with the completion of the last operation just described. Then the first synchronizing pulse associated with the next number causes the multivibrator 57 to drive the multivibrator 74 and causes the tube 40 to conduct at its first cathode $C_{11}$. The resulting pulse is a "resetting" pulse for the bistable multivibrator 71, and causes the gates 70, 80 to be opened.

The entire cycle of operation thus far described is repeated until the last number, e.g., 256 of the static magnetic memory above described, has been interrogated.

As will be apparent, since the tape-stored information is recorded on a continuous loop of tape, there is a time delay between the start and finish of the information, or between successive items of information. During such time delay, since no pulses are detected by the head $H_2$, the multivibrator 56 remains in its "set" state for a relatively long period of time.

Figure 6:
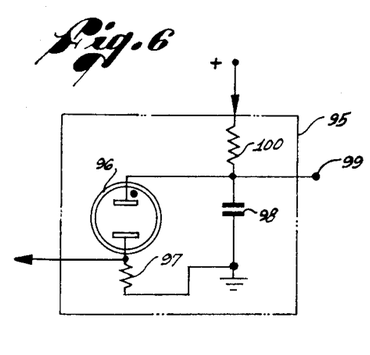
FIGURE 6 is a circuit diagram of the reset circuit in FIGURES 3 and 5.

A novel reset network 95 is provided for the multivibrator 56 to automatically set it in its initial state. As shown in FIGURE 6, the reset network 95 includes a glow tube 96 that is connected in series with a resistor 97 across a capacitor 98. In operation, pulses are applied at a terminal 99 that is connected to the junction of the capacitor 98 and resistor 100. As shown, the series circuit including the resistor 100 and the capacitor 98 is connected across a source of potential.

The charging rate of the capacitor 98 is quite slow. If pulses are received frequently, the tube 96 is triggered to pass a very small amount of current. But if a substantial interval occurs when no pulses are received, as in the manner previously mentioned, then the charge on the capacitor 98 moves to a level to fire the tube 96. This causes a pulse to pass back to the multivibrator 56 so as to reset it to its initial state. Simultaneously, the pulse output from the reset network 95 operates the multivibrator 92 to drive the tube 91 so that conduction is transferred from its first cathode $C_1$ to its second cathode $C_2$.

The above described operations effect the transfer of 256 numbers from tape to static memory. If only the switch 82 is closed, no more information goes into or out of the static memory, regardless of how many times the loop of magnetic tape circulates. But our invention utilizes the switches 82–90 as program controls in carrying out automatically the transfer of a preselected fractional part of the tape-stored information to the static memory. As will be seen, the tape loop circulates continuously, and the tube 91 steps once for each revolution of the tape. Whenever one of the switches 82–90 associated with the conducting cathode is closed, the gate 81 is opened so as to allow the system 36 to initiate transfer of information from the register into the static memory. But if a switch associated with the conducting cathode is open, the gate 81 remains closed, and no information goes from the register to the memory.

To establish automatic "halving" operations, we arrange during recording to omit the last synchronizing pulse of the last number, i.e., the last synchronizing pulse of the last number does not follow the last information pulse as do the last synchronizing pulses of the preceding numbers. Therefore, after the last information pulse of the last number, the multivibrator 57 does not return to its initial state. Accordingly, the tube 40, instead of stepping so as to conduct at its first cathode $C_{11}$, remains conducting at its last, or tenth, cathode $C_{20}$.

While the multivibrator 57 is thus not "reset," then, on the next circulation of the tape loop, the first synchronizing pulses causes the tube 40 to transfer its state of conduction from its tenth cathode $C_{20}$ to its first cathode $C_{11}$ (instead of causing the tube 38 to conduct at its second cathode $C_2$). The consequence of this mode of not resetting the multivibrator 57 is the loss of the first information pulse, and the second information pulse passes through the system to the $2^0$ stage of the register. In effect, this amounts to a "one-place digital shift to the left," and the information coming from the tape is halved in being ransferred to the register serving the static memory, i.e., the $2^1$ digit on the tape appears at the $2^0$ position in the register. And as will be apparent, since every revolution of the tape loop causes a repetition of this effect, each revolution adds an additional "shift of the digits to the left" before the information appears at the register and is added to what is already stored therein.

It will now be seen that by presetting the switches 82–90 for controlling the gating of the "write" pulses, one can cause any combination of halves of the taped information to enter the static memory. The operator merely closes the desired ones of the switches 82–90, and starts the tape circulating. The system transfers a fraction of the taped information corresponding to a closed switch and rejects all fractions corresponding to open switches.

When the tube 91 has stepped to conduction at its last cathode $C_{10}$, a pulse is sent back to its driving multivibrator 92 to render it inoperative until manually reset.

Figure 3:
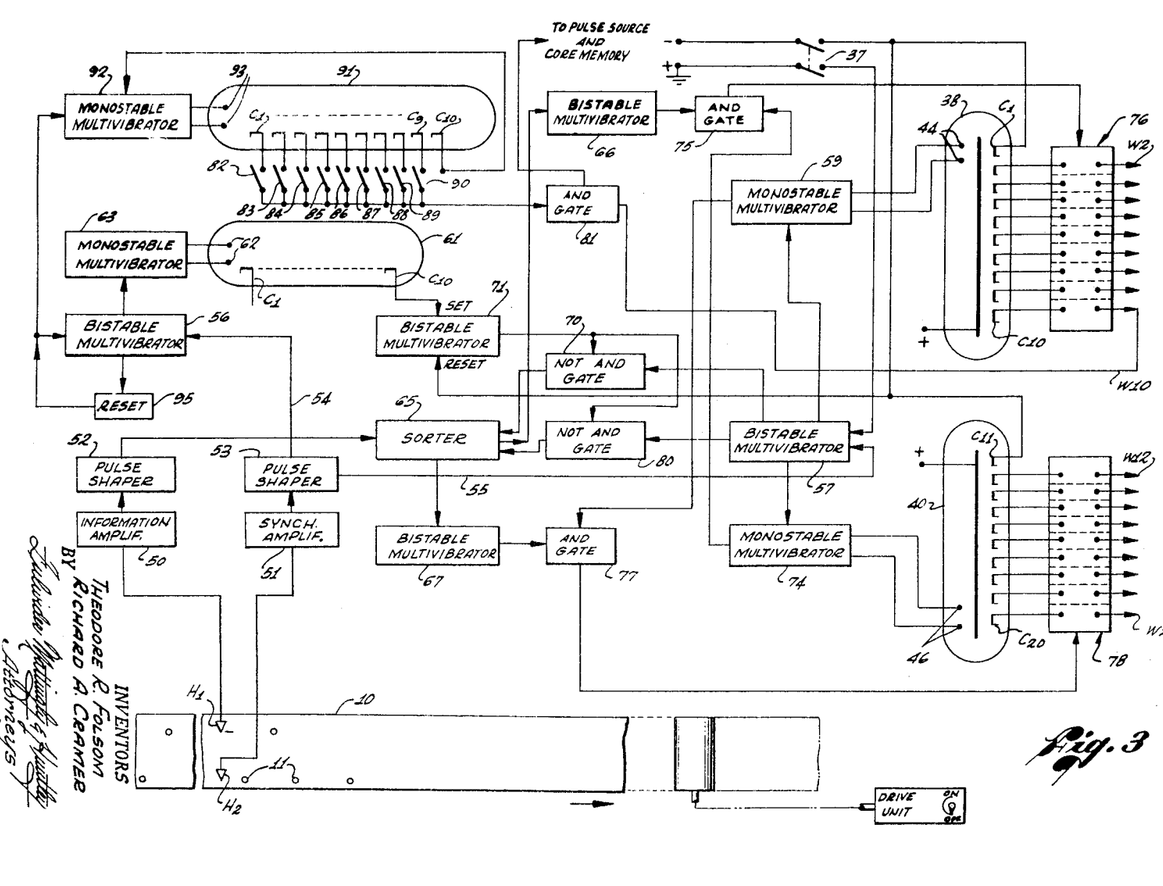
FIGURES 3 and 4 are schematic diagrams of cooperatively related portions of the system constructed in accordance with the present invention.
Figure 5:
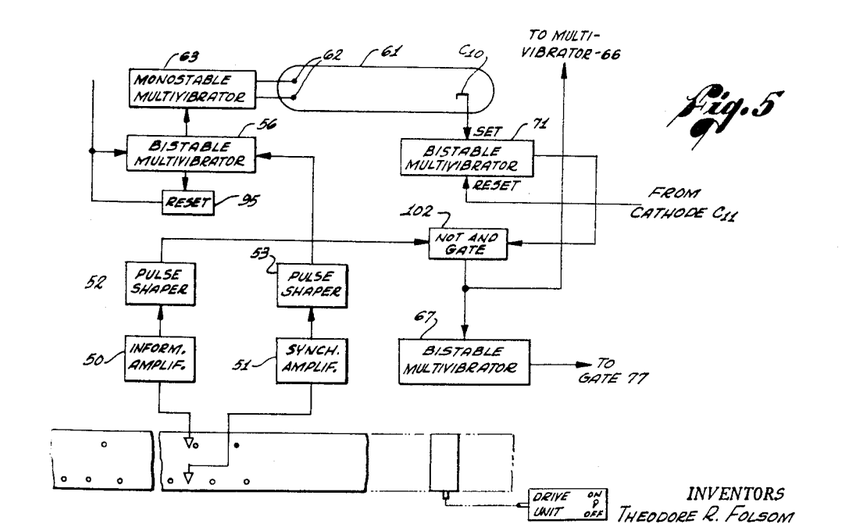
FIGURE 5 is a schematic diagram of a modification of the network of FIGURE 2.

FIGURE 5 illustrates a modification of the circuit of FIGURE 3 that does not require sorting of pulses. Information pulses are fed directly from the pulse shaper 52 to a "not and" gate 102. The gate 102 is similar to the gates 70, 80, but is connected so that its output feeds pulses to both the multivibrators 66, 67. The gate 102 is controlled by the multivibrator 71 in the manner previously described for the gates 70, 80.

Figure 8:
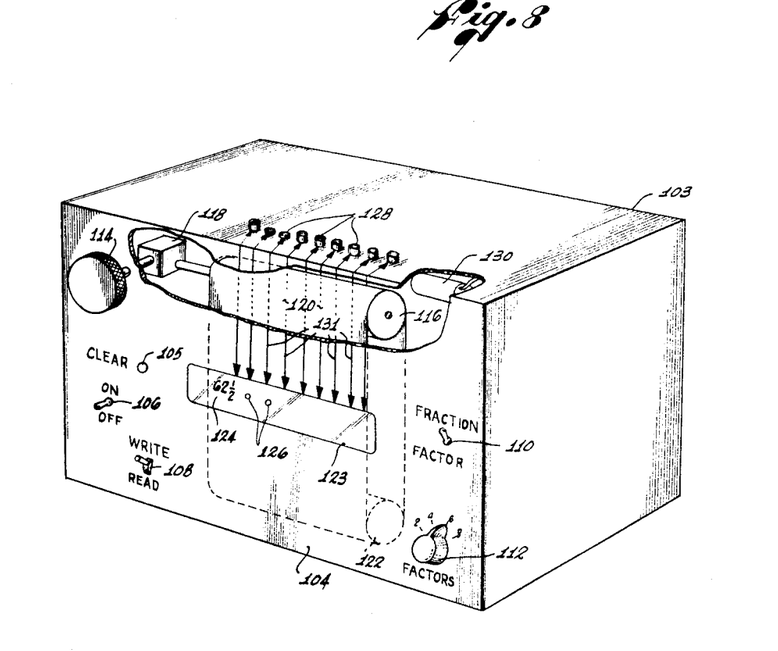
FIGURE 8 is a perspective view of another mechanical apparatus, partly broken away, for use in the control unit of the present invention.

Reference will now be had to FIGURE 8 which shows a cabinet 103 that may be employed to house the control system of FIGURES 3 and 4. The front panel 104 of the cabinet 103 may be provided with a number of controls which are appropriately connected to various of the switches in the system described. These controls include: a clear button 105, which is depressed at the start of the operation; an "on—off" switch 106 for the power; a "read—write" control 108 to set the direction of information transfer; and a multiplier selection 110, to control the multiplication of values by either a factor or a fraction.

If the numerical values are to be multiplied by a factor, a pointer 112 is provided to be turned to indicate the desired factor. In the event that a fractional transfer is to be made, a knob 114 is turned to revolve a roller 116 through a gear box 118. The roller carries a continuous length of material 120 which has a chart recorder thereon. The material 120 also passes over an idler 122, so that when the roller 116 revolves the material 120 is moved to display various information at a window 123 in the panel 104. Percentage values 124 appear at the left of the window, and at the right are dots 126, which are positioned in alignment with push buttons 128 at the top of the cabinet 103.

The push buttons 128 are provided for actuating the switches 82–90 of FIGURE 3. Such push buttons are adapted to be depressed to move a switch contact arm to the closed position, and to remain in such position until it is desired to reset them. A solenoid 130 may be employed to reset the buttons 128 (and associated switches 82–90) under the control of the clear button 105.

To operate the push buttons 128, the knob 114 is rotated until the desired percentage number 124 appears in the window 123. Then the push buttons that are aligned with dots that show up alongside the percentage number are depressed, whereby to set the system for operation as previously described. To aid in making the proper push button selection, parallel lines 131 are scribed on the front panel 104, and continue along the top surface to the push buttons 128. If desired, the lines 131 may be provided with arrow heads at either or both ends. With such an arrangement, the push buttons that are aligned with the dots in the window are seen clearly, and guesswork on this point is eliminated.

Although the previously described electrical system represents one satisfactory embodiment of the invention, a similar system of our invention employs electromechanical control means. One form of such an electromechanical system is shown in FIGURE 7 and will now be considered in detail.

Figure 7:
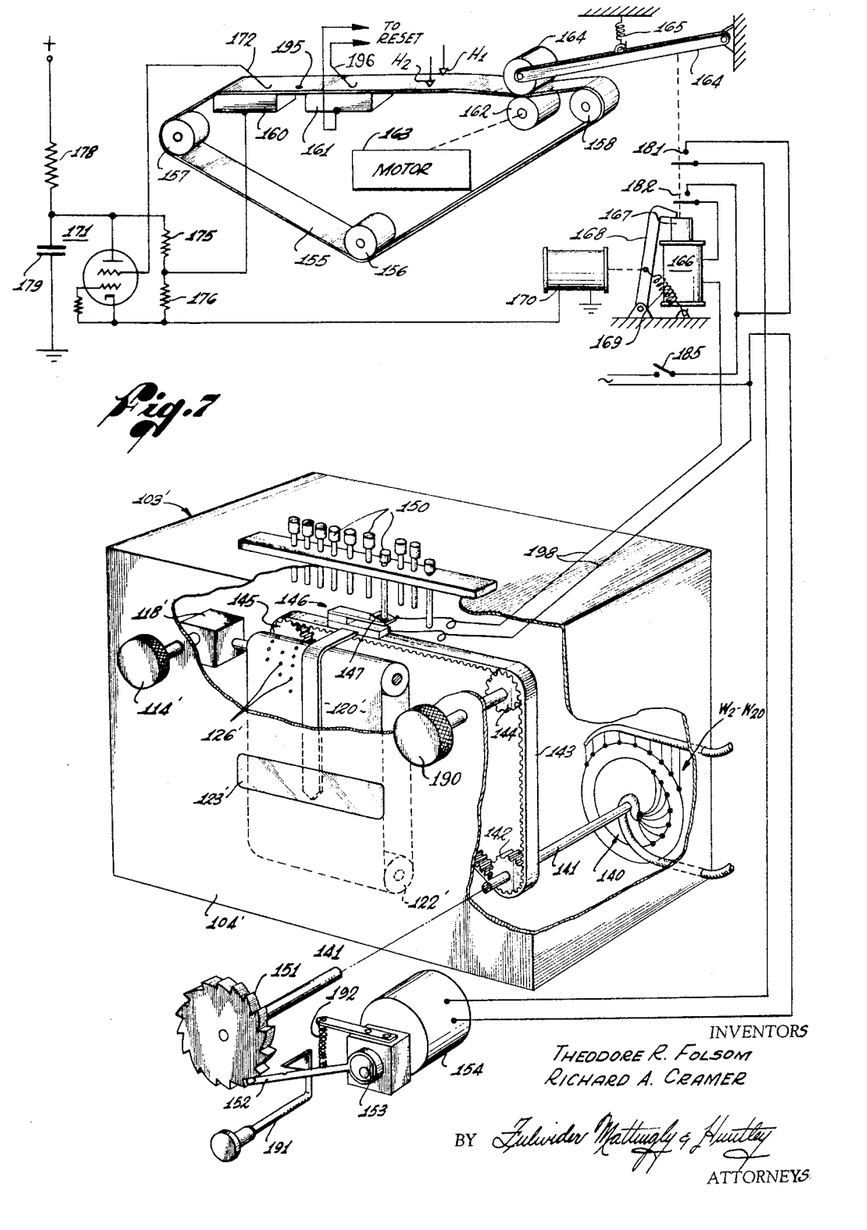
FIGURE 7 is a diagrammatic and sectionalized perspective view of electromechanical apparatus of our invention for use in an apparatus of the present invention.

In the system of FIGURE 7, the conductors $W_2$ through $W_{20}$ are connected through a rotary multiple-contact switch 140 which may be variously positioned to provide a desired digit shift resulting in multiplication by factors of two (or one-half). As a result of the switch 140, the desired transfers are made immediately in sequence, as the digit shifts do not occur one digit at a time.

In general, the control unit of FIGURE 7 is set up somewhat similar to that of FIGURE 8, and prime numbers are used to identify similar parts. As shown, the switch 140 is enclosed in the housing 103′, and an actuating or control shaft 141 for the switch 140 extends to the exterior of the front panel 104′. The shaft 141 carries gear means 142 for meshing engagement with teeth on a belt 143. As shown, the belt 143 is trained about gear means 142, 144, 145, which are arranged so that the upper portion of the belt is horizontally disposed.

The belt is adapted to effect switching operations, and to this end a normally open microswitch 146 is secured to the belt on its upper surface. The movable contact of the switch 146 has an inclined surface portion 147 that is adapted to pass under a row of vertically movable pins 150. The pins 150 extend through openings in the top of the housing 103′, and are suitably adapted, as by friction, to be releasably held in any desired position. Normally, the pins 150 are in an upper position in which the inclined portion 147 can pass under them without touching. But if a pin is depressed, its lower end is in the path of the inclined portion 147, which on passing under the pin is cammed downwardly thereby to effect closure of the switch 146.

To operate the belt 143 to effect movement of the switch 146 under the pins 150, we provide a ratchet wheel 151 on the shaft 141, and a pawl 152 to actuate the ratchet wheel 151. The pawl 152 is mounted on an eccentric crank 153 that is rotatable by a motor 154. The rotation of the crank 154 imparts linear movement to the pawl 152, whereby the end of the pawl is forced against a tooth on the ratchet wheel 151 to turn it, and thereby turn the shaft 141 to change the position of the switch 140.

The motor 154 is operated under the control of the switch 146 and the loop of magnetic tape 155. To this end, the tape 155 is supported on rollers 156, 157, 158, and is arranged between the upper rollers 157, 158 to ride on spaced contact plates 160, 161. As indicated, the sensing heads $H_1$, $H_2$ are located adjacent the edges of the tape on the upper surface thereof, and in alignment with the tracks on the tape. The tape is disposed between a driving roller 162 that is operated continuously by a motor 163. An idler roller 164 is provided for biasing the tape against the driver to effect movement of the tape. When the idler 164 is lifted, the tape stops, i.e., the driving frictional engagement of the driver with the tape is broken.

As shown, the idler 164 is carried on a pivoted arm 165, and is normally urged, as by a spring 166, away from the tape 155. The idler 164 is brought against the tape by electromechanical means, shown as a solenoid 166 having its armature 167 linked to the arm 165. When the solenoid is energized, its armature 167 moves downwardly, carrying the arm therewith to bring the roller 164 against the tape. A latch or detent element 168 is biased toward the solenoid, as by a spring 169, so as to engage the armature 167 and keep it in its lower or retracted position.

When the latch 168 is moved away from the armature 167, the spring 165 carries the arm 164 and the armature 167 upwardly, thereby to cause the tape to stop for the reasons previously explained. Retraction of the latch 168 for this purpose is effected through a solenoid 170, which in turn is coupled through an amplifier network 171 to the block 160 and to a contact element 172 that rides on the tape above the block 160. In this connection, the contact element 172, which may be a leaf spring element, is connected to the screen grid of the amplifier tube, and the block 160 is connected to the junction of a pair of resistors 175, 176 that are connected between the plate element and the coil of the solenoid 170. As shown, the plate of the tube is coupled through a resistor 178 to the positive terminal of a plate supply source, and a capacitor 179 is connected between the plate and ground.

Whenever the contact 172 engages the plate 160 directly, the amplifier 171 feeds an energizing current pulse to the solenoid 170 causing it to actuate the latch 168 and withdraw it from the solenoid 166.

The control circuit for the motor 154 also includes a pair of switches 181, 182 that are adapted to be opened or closed depending on the condition of the solenoid 166. When the solenoid 166 is not energized, the movable contacts of the switches 181, 182 are closed against their fixed contacts. These switches are opened when the solenoid 166 is energized.

A source of alternating voltage is adapted, through a start switch 185, and through the switches 181, 182, to be connected in circuit with the motor 154. In the embodiment shown, a series circuit across the A.-C. source is traceable through the switch 185, the switch 182, the coil of the solenoid 166, the microswitch 146, the switch 181, and the control winding of the motor 154.

The operation of the system of FIGURE 7 will now be described. The microswitch 146 is initially positioned so that the inclined portion 147 is to the left of the bank of programming pins 150. Such initial positioning is effected manually, as by a knob 190 for turning the gear 144 counterclockwise. To permit this operation, the pawl 152 is lifted away from the ratchet wheel 151, as by moving a control member against the pawl 152. The pawl, as shown, is normally held by a spring 192 against the ratchet wheel 151. When the microswitch 146 has been moved to the desired position, the member 191 is released, to again allow the pawl 152 to engage the ratchet wheel 151. The desired pins 150 are next depressed, to set up the desired programming to be carried out. In the example shown, two pins 150 are depressed (in accordance with positions indicated in the window 123') to indicate when the switch 140 reaches successive positions for multiplying by ½ to the fifth and eighth powers.

The tape 155 is provided with a small opening 195, and the contact 172 is so positioned that the opening 195 will pass under the contact and permit it to engage the block 160. Initially, the tape is positioned with the opening 195 located between the blocks 160, 161. Also, the motor 163 is arranged to rotate the driver 162 clockwise. Thus, the tape may make one circulation before the opening 195 reaches the contact 172. In the initial position of the tape, the solenoid 170 is deenergized, the latch 168 is removed from the armature 167, the arm 164 and the idler 164 thereon are in the upper position, and the switches 181, 182 are closed.

With the above described initial positions of the components, closure of the switch 185 causes the field winding of the motor 154 to be connected to the A.-C. source (through switch 181) to start the motor 154. The pawl 152 then acts on the ratchet wheel 151 to step the shaft 141 around.

As the shaft 141 steps around, the switch 146 passes under the first depressed pin 150 in its path, thus causing the inclined portion 147 to ride down and close the switch. Through the flexible cable leads 198 from the switch 146, the solenoid 166 is energized to retreat its armature 167, thus opening the switches 181, 182. The latch 168 immediately engages the armature 167 and holds it down. The opening of the switch 181 breaks the connection to the motor 154, and it stops.

The retraction of the armature 167 carries the idler 164 against the tape 155, thereby causing the tape to start circulating. Information thus picked up from the tape is modified by the factor determined by the position of the switch 140 when it started circulating. The tape again stops and then the switch 146 moves further to the right seeking out the whole program.

It should be noted at this point that the steps imparted to the belt 143 are such that the switch 146 "overrides," i.e., the top of the incline 147 passes under the pin 150, and goes on by the pin during a single step of the ratchet wheel 151. There is thus only a momentary closure of the switch 146 to change operations as described.

The arrangement is such that when the tape 155 starts moving, the opening 195 passes over the block 161. A contact element 196 engaging the tape is thus caused to engage the block 161. This results in a pulse being provided for reset purposes, i.e., the electromechanical system of our invention may substitute for the reset network, the multivibrators 56, 92, and the tube 91 of FIGURE 3.

A unique advantage of the system of FIGURE 7 is that it requires circulating the tape only once to obtain the desired information, thus minimizing the time required to carry out a program.

Although our invention has been illustrated and described only for the playback mode, it will be apparent that it is readily adaptable for recording information on the tape. For recording, an oscillator and counter, such as are shown and described in the above-mentioned pending application, would be used. And it will be apparent that the system of such pending application can readily be adapted to use dual track tape recording, instead of the single track recording there described.

It should not be assumed that the foregoing description is restricted to use only information expressed in simple binary numbers. Information expressed in so-called "coded-binary" can also be used, and to special advantage in some cases. For example, matrix memories and registers can be arranged so as to permit the transfer of information in the binary-code-decimal form. In other words, the present invention can be applied to several other systems of coding, where information is present on registers in some sort of a "yes-no" form.

It will be apparent that various modifications may be made in the various embodiments herein illustrated and described without departing from the spirit and scope of our invention. Accordingly, we do not intend that our invention be limited except as by the appended claims.

We claim:

1. In a data transfer system, the combination of: dual track tape means to carry a recording of synchronizing pulses and information pulses, wherein a single synchonizing pulse precedes the first information pulse past a predetermined point; pickup devices for the respective tracks; amplifier and pulse shaping networks coupled to each pickup device; a pair of multi-cathode glow tubes; gating devices coupled to cathodes of said glow tubes; a third multi-cathode glow tube; a set-reset multivibrator coupled to the last of the cathodes of said third tube; gate means connected between said set-reset multivibrator and the amplifier and pulse shaper network for the information pulses; a connection from the last cathode of one of said pair of glow tubes to said set-reset multivibrator; means coupled to the amplifier and pulse shaper network for the synchronizing pulses for controlling the state of conduction of said third tube; and respective means coupled to said gate means to establish gating pulses to be passed by the operable gating device.

2. In a data transfer system, the combination of: dual track tape means to carry a recording of synchronizing pulses and information pulses, wherein a single synchronizing pulse precedes the first information pulse past a predetermined point; pickup devices for the respective tracks; amplifier and pulse shaping networks coupled to each pickup device; a sorter coupled to the amplifier and pulse shaping network for the information pulse pickup device; a pair of multi-cathode gas tubes; gating devices coupled to cathodes of said gas tubes; respective means coupled to said sorter to establish interrogation pulses to be passed by the operable gating device to a utilization network; control means responsive to the output of the amplifier and pulse shaping network for the synchonizing pulses to control the condition of operation of said sorter and the sequence of operations of said gas tubes, said control means including a bistable multivibrator coupled to the amplifier and pulse shaper network for the synchronizing pulses, means utilizing said multivibrator for stepping said gas tubes for operation at successive cathodes, a register having a plurality of stages coupled to receive pulses from respective gating devices; a second bistable multivibrator coupled to the amplifier and pulse shaper network for the synchronizing pulses; a third multi-cathode gas tube having switching electrodes controlled by said second multivibrator; a set-reset multivibrator connected to the last cathode of said third tube; a pair of not-and gating devices coupled to said first and set-reset multivibrators and to said sorter; and a connection from said set-reset multivibrator to the first cathodes of said pair of tubes.

3. A combination as defined in claim 2, further including a fourth multi-cathode glow tube having switching electrodes controlled by said second multivibrator; a plurality of selectively operable switches connected to cathodes of said fourth tube; gating means coupled to said switches; a connection from the last cathode of said fourth tube to said gating means; a pulse source and core memory system for connection to the stages of said register; and a connection from said gating means to said pulse source and core memory system.

4. A combination as defined in claim 3, further including a housing having pushbuttons adapted to actuate the respective switches; a window; a chart having information viewable through the window for determining the ones of said switches to be closed; and guide lines extending from each pushbutton to a corresponding point adjacent said window.

5. A combination as defined in claim 2, further including automatic reset means for said second multivibrator, said reset means including a glow tube and resistive means in series across a capacitor, and characterized by a slow charging rate for said capacitor so that a long interval between pulses applied to said glow tube causes it to fire and reset said second multivibrator in its initial state.

References Cited by the Examiner

UNITED STATES PATENTS

| | | | |
|---|---|---|---|
| 2,615,551 | 10/1952 | Mills et al. | 226—9 |
| 2,698,427 | 12/1954 | Steele | 235—167 |
| 2,791,422 | 5/1957 | Baer | 226—9 |
| 2,834,544 | 5/1958 | Daino et al. | 235—61.6 |
| 2,925,587 | 2/1960 | Thorensen et al. | 235—167 |
| 2,944,733 | 7/1960 | Austin | 235—61.6 |
| 2,982,472 | 5/1961 | Huskey | 235—167 |
| 3,130,300 | 4/1964 | Wright et al. | 235—167 |

ROBERT C. BAILEY, *Primary Examiner.*

CORNELIUS D. ANGEL, MALCOLM A. MORRISON, *Examiners.*

D. W. COOK, P. J. HIRSCHKOP, G. D. SHAW, *Assistant Examiners.*